United States Patent [19]
Coles et al.

[11] 3,901,988
[45] Aug. 26, 1975

[54] INFLATABLE TRUNK FOR AIR CUSHION SUPPORTED VEHICLES

[75] Inventors: Alan V. Coles, Williamsville; Lawrence H. Kocher, Tonawanda, both of N.Y.

[73] Assignee: Textron, Inc., Providence, R.I.

[22] Filed: Dec. 3, 1973

[21] Appl. No.: 421,335

[52] U.S. Cl. ............... 428/231; 180/124; 180/128; 244/110 R; 244/110 H; 244/100 A; 428/131; 428/238; 156/296
[51] Int. Cl.² .......................................... B32B 3/10
[58] Field of Search ............. 161/109, 112, 175, 47, 161/76, 77, 144, 60, 90, 55, 57, 58; 244/100 A, 110 R, 110 H, 107 R, 109; 180/124, 128, 127, 125; 139/389, 421

[56] References Cited
UNITED STATES PATENTS

| | | | |
|---|---|---|---|
| 2,659,957 | 11/1953 | Lilienfeld | 161/77 |
| 3,455,100 | 7/1969 | Sidles et al. | 161/175 |
| 3,485,695 | 12/1969 | Ness | 161/109 |
| 3,642,565 | 2/1972 | Ogata et al. | 161/175 |
| 3,690,401 | 9/1972 | Earl | 161/47 |
| 3,738,597 | 6/1973 | Earl et al. | 244/102 R |

*Primary Examiner*—George F. Lesmes
*Assistant Examiner*—R. J. Roche
*Attorney, Agent, or Firm*—Bean & Bean

[57] ABSTRACT

There is disclosed in air cushion type airplane undercarriages, or air cushion vehicle or other "surface effect" machine air cushion seals of the inflatable trunk type an improved omni-directionally elastic fabric from which to construct such trunks so as to render the machines supportable by means of air films/cushions relative to reaction surfaces. The fabric of the invention is a laminate of tensile fibers in an elastomeric matrix, which is elastic (to different degrees and within different limitations in different directions) and is patterned to incorporate within various areas thereof specifically dimensioned small area slots or elliptically shaped openings therethrough, which upon inflation of the trunk and consequent girthwise extension of the fabrication open up into relatively large area, substantially circularly shaped ports, for delivery of air through the trunk against a reaction surface.

8 Claims, 11 Drawing Figures

INFLATABLE TRUNK FOR AIR CUSHION SUPPORTED VEHICLES

BACKGROUND AND GENERAL DESCRIPTION OF THE INVENTION

The invention herein described was made in the course of or under a contract with the Department of the Air Force.

This invention relates to "air cushion" supported machines, such as airplanes of the type disclosed for example in U.S. Reissue Pat. No. 26,812, or ground effect machines such as disclosed for example in U.S. Pat. No. 3,365,017; which machines employ inflated trunk type arrangements for confining the machine lift air cushion. More specifically, the invention relates to a trunk construction fabric for such purposes whereby the air exit apertures therethrough (as shown for example at 24 in U.S. Pat. No. 3,690,401) are provided for by means of an improved laminate layup system which results in an improved fabric construction for the intended usage.

The fabrication comprises a lamination of parallel arrays of longitudinally coiled or undulant or otherwise elastically extendible (within limits) high tensile strength strands extending in the girthwise directions of the wall structure, in combination with cross-laid rigid or low-elastic high tensile strength strands disposed to extend in the lengthwise directions of the trunk structure; all embodied within or in layered association with an air-sealing elastomeric matrix or sheet(s). In consequence, the trunk cell structure is readily adaptable to girthwise expansion-contraction deformation (but only within prescribed limits) to provide improved elastic expansion control procedures throughout various sections of the structure so as to regulate the inflated shape of the structure; while also being operable to resist deformations of the inflated shape of the fore-and-aft directions of the structure incidental to taxiing, takeoff, and landing maneuvers of the aircraft.

As explained in the aforesaid Patents, with regard to the prescribed planform of a given trunk system, a stockpiece of differentially flexible/elastic sheet material may be fabricated and "tailored" to the prescribed trunk system planform as well as to any typically encountered three-dimensionally curviformed fuselage to which it is to be attached; so that when the trunk structure so produced is inflated it will assume the desired balloonlike configuration without inherent fabric stress concentrations at localized areas thereof. When deflated, the structure will by nature retract and compactly hug the hull or fuselage or frame of the attended vehicle, as the case may be. When inflated, the system features improved resistance to planform distortion, such as would otherwise occur and adversely affect the vehicle support "air cushion effect" operation.

The present invention provides for an improved construction ambient to the air exit ports through the fabric; and in consequence, integrity of the prescribed air cushion space planform shape and dimensions is preserved, and the trunk structure is better protected against wear and tear damage. To this end the stocksheet fabrication preferably comprises transversely disposed multiple layers of tapes embodying the strands referred to hereinabove within a matrix as aforesaid. The laminate layup design is such that the reinforcing fibers are routed around the initially formed openings through the fabrication during the laminate layout in such manner that no reinforcing fibers are interrupted and so that minimum stress concentrations develop under elastic elongation conditions. Incidentally, the perimeters of the ports are structurally reinforced, whereby the ultimate material strength of the fiber/matrix is not reduced and the trunk is of improved resistance to wear/tear damage. Furthermore, the fabrication provides exit ports which are of substantially constant areas throughout the normal operating range of fabric elongation.

THE DRAWING

Figure 8:
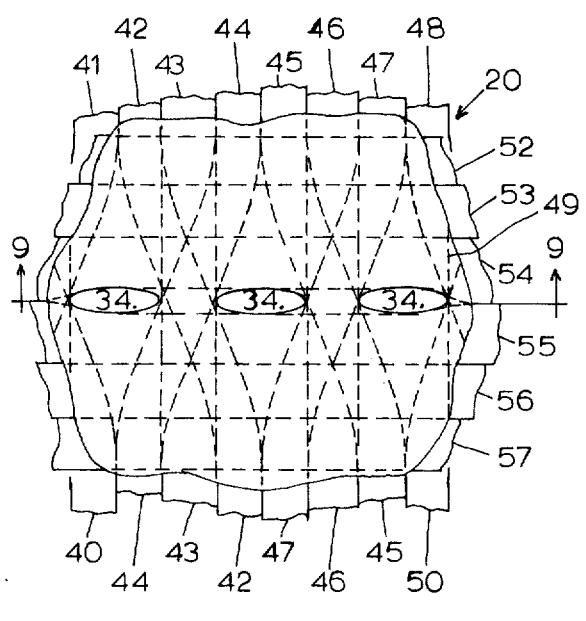
FIG. 8 is a fragmentary plan view illustration of a trunk fabric construction of the present invention showing air escape apertures therethrough as initially formed, and when the fabric is in its relaxed condition.
Figure 10:
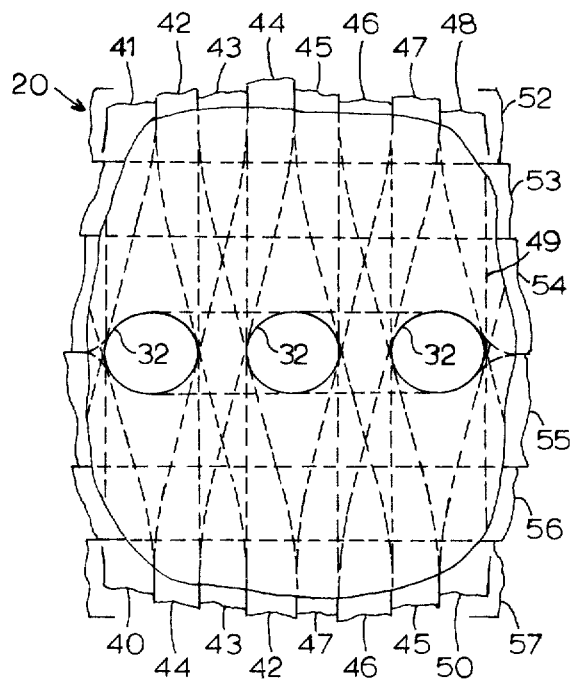
Figure 11:
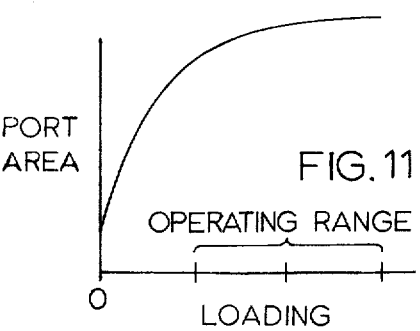

FIG. 10 is a view corresponding to FIG. 8 but showing the fabric in an approximately 100 percent elastically elongated condition (in one direction only), and illustrating the circular configurations consequently assumed by the air escape ports; and FIG. 11 is a graphical representation of test data illustrating the port-area increase rate relative to applied loading on a typical sample of fabric made in accordance with the invention.

As shown by way of example herein at FIGS. 1–4, the invention may be embodied in an air cushion confining trunk system comprising the undercarriage of an airplane wherein the fuselage or hull thereof is indicated generally at 10. More specifically, the trunk system is shown to comprise a rectangularly-toroidal-shaped trunk as indicated generally at 12 which is formed of a special fabric sheeting attached to the belly of the airplane fuselage to provide an air cushion confining space therebelow. Thus, the aircraft may be supported in friction-free relation above a reaction surface incidental to landings, takeoffs, and taxiing maneuvers. It is to be understood however that the invention is equally applicable to other air cushion defining inflatable trunk shapes and/or arrangements, such as are typically used in connection with ground effect machines, or the like.

Figure 1:
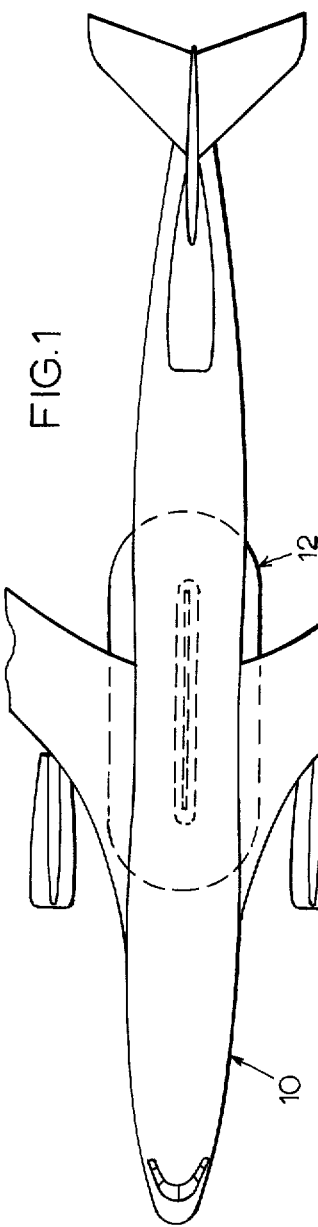
FIG. 1 is a fragmentary plan view of an airplane such as may advantageously employ an air cushion type undercarriage utilizing an elastic trunk fabric construction of the present invention.
Figure 2:
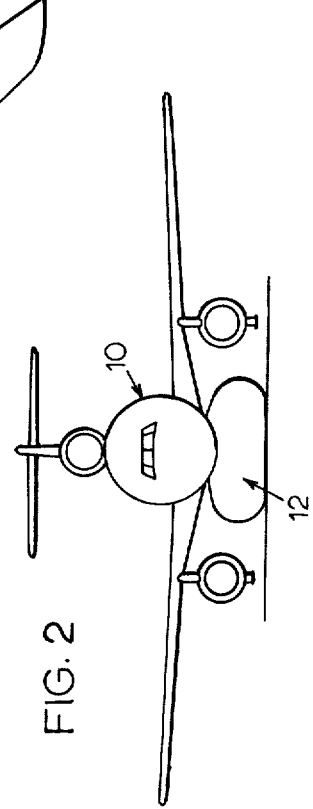
FIG. 2 is a front elevational view thereof.
Figure 3:
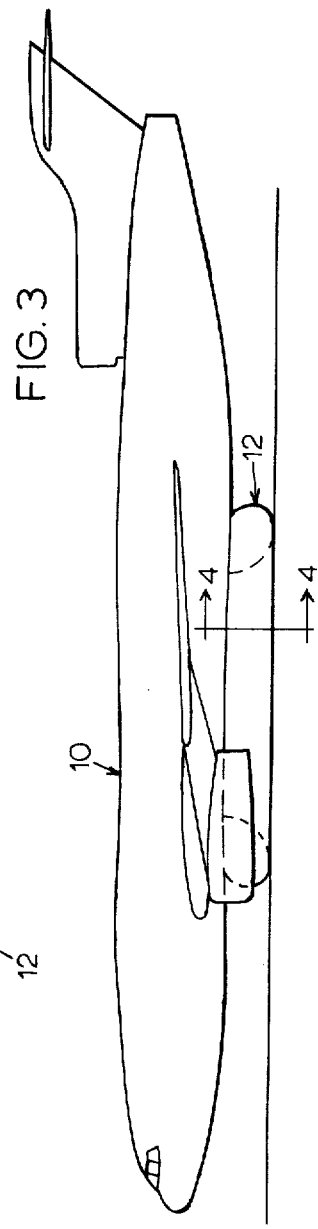
FIG. 3 is a side elevational view thereof.
Figure 4:
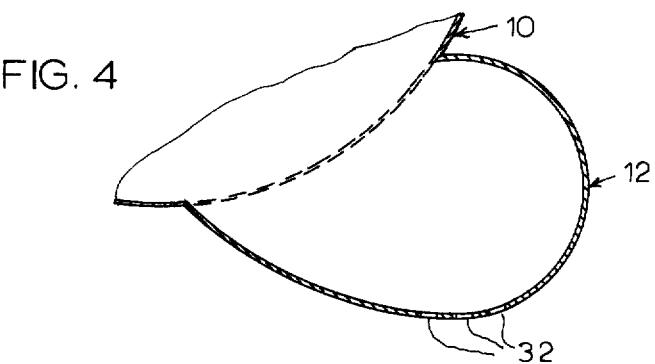
FIG. 4 is an enlarged scale fragmentary sectional view of the undercarriage trunk construction, taken as suggested by line 4—4 of FIG. 3.

As explained in the aforesaid referenced patents, means are provided to deliver the air into the interior of the inflatable trunk device to thereby inflate the latter as shown in the drawing herewith. Furthermore, the bottom "footprint" surfaces of trunk device 12 are formed with holes or ports as indicated at 32 (FIG. 4)

through which jets of compressed air issue to establish the machine supporting air cushion.

The present invention features employment in such trunk devices as aforesaid, of a novel flexible sheet material fabrication, the method and details of construction thereof being illustrated by FIGS. 5–8 herewith. Basically, the sheet fabrication as indicated at 20 (FIG. 8) will comprise a combination of layered, transversely disposed "stretch control" strands of high tensile strength material such as Nylon, or the like, embedded within or otherwise associated with an airtight film or layer; the various "stretch control" strands being appropriately and selectively oriented so as to accomplish the objects set forth hereinabove.

Figure 9:
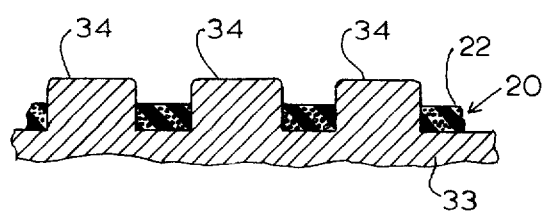
FIG. 9 is a sectional view taken as suggested by line 9—9 of FIG. 8.

The fabric stocksheet 20 may generally comprise a laminate formed of crossed tapes having different elastic elongation characteristics as will be explained more fully hereinafter; the tapes being enclosed within upper and lower layers of rubber or the like and vulcanized together to form an integrated elastic structure, as best shown at FIGS. 8, 9, 10. All of the tapes include tensile strands of Nylon or the like embedded within a matrix of rubber or the like. As explained in U.S. Pat. No. 3,690,401 it will be appreciated that the straight-line portions of the trunk sheet need be elastic only in the girthwise directions thereof. However, the rounded corner portions of the trunk sheet must be omnidirectionally elastic in order to provide a trunk system which when inflated will balloon out to the configuration shown in FIGS. 1–4 of the drawing herewith, and the patent explains how the fabrication may be designed to provide the desired smoothly contoured form thereof without internal restraint or stress concentrations in the areas of transition from cylindrically to spherically curved forms.

Figure 5:
FIG. 5 illustrates a fragmentary length of elastic thread such as is used in compounding an elastic trunk fabrication in accordance with the invention.
Figure 6:
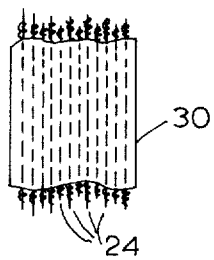
FIG. 6 is a plan view fragmentary illustration of an initial step in fabricating a tape component of the construction.
Figure 7:
FIG. 7 is a sectional view through a typical tape construction fabricated as illustrated by FIG. 6.

Thus, the tapes running girthwise of the trunk to be constructed from the fabric may comprise parallel arrays of precoiled (or crimped) Nylon strands designated 26, which are preferably preassembled upon core threads 28 of rubber or the like for convenience in handling (FIG. 5). The strands 26 are assembled as shown at FIGS. 6, 7, so as to be "sandwiched" between layers 30—30 of rubber or the like, to provide the girthwise "tapes". The crosswise disposed tapes extending lengthwise of the trunk to be constructed from the fabric also comprise rubber matrices having straight (or only slightly coiled or crimped) strands of Nylon, depending upon the stretch characteristics prescribed for the lengthwise "run" of the trunk construction; the composite being pressed or heat-rolled together and vulcanized or otherwise adhesively integrated to facilitate handling.

As explained in U.S. Pat. No. 3,690,401 whenever it is required to provide an appropriately operable inflatable air cushion confining trunk system for such purposes, a multilayered sheet fabrication may be laid down upon a flat work table so as to encompass the plan view dimensioned extent of the prerequiste zones of attachment of the undercarriage structure to the airplane fuselage. The stocksheet is then cut or tailored to appropriate shape and dimensions. Any variants of dimensionally elastic/rigid requirements for the various parts of any given trunk planform configuration may thus be readily accommodated, so that the trunk system will expand to the desired form when inflated and will hold this form against shape distortions such as would otherwise be induced by drag forces operating thereon incidental to taxiing, takeoff and landing maneuvers of the craft. Furthermore, it will be apparent that a trunk system of the invention may be readily fabricated and tailored to the configurations of a large variety of hull shapes, so that in any case when the trunk system is deflated it will elastically contract into flat and smoothly fitting, compactly nested, relation against the vehicle hull; thereby maximizing aerodynamic efficiencies for such craft when so equipped.

The present invention however deals with the problem of providing the air exit apertures through the fabric such as are illustrated at 32 (FIG. 10 of the drawing herewith); and the method of the invention is illustrated at FIGS. 8, 9, 10. As best shown at FIGS. 8, 9, the layout table 33 upon which the laminate is formulated is provided with upstanding mandrels or the like as indicated at 34; the mandrels being sectionally shaped and dimensioned to complement the desired shapes and dimensions of the air exit apertures through the fabric when the latter is in its relaxed condition. A bottom layer of rubber or the like may be placed on the table and the girthwise and lengthwise tapes as hereinabove described are then laid down in cross-laminating fashion. It should be particularly noted that in accordance with the present invention the tapes are routed around the mandrels during the layup process, whereby none of the tapes and/or the included tensile strands are interrupted by the apertures through the fabrication.

This routing process is illustrated at FIG. 8 wherein typical girthwise tapes are designated at 40–50 inclusive, and typical lengthwise tapes are indicated at 52–57 inclusive. It is to be noted that as the tapes are routed around the mandrels 34 they overlap and thus reinforce the walls of the fabrication circumscribing the mandrels, and that none of the tensile strands interiorly of the tapes are cut or otherwise interrupted. Thus, the fabrication will be built up as is also illustrated at FIG. 9 so as to include as many laminations of cross-laid tapes as may be required in any given instance to provide the prescribed sheet fabrication. To finalize the fabrication top layer of rubber or the like is applied to the upper surface of the assembly and the entire fabrication is then autoclaved under vacuum and heat so as to compress and vulcanize the assembly into a single integrated sheet-like fabric. It will be understood that upon removal of the fabrication from the worktable and the mandrels, the desired air exit apertures will have been formed therethrough; their geometries being complementary to the sectional geometries of the mandrels.

Note that some of the elastic tapes (such as 43, 46, 49 of the Series 40-50 as 40–50 in FIGS. 8, 10) are routed to pass straight through between the aperture areas or mandrels 34 (as the case may be) in the girthwise direction of the fabric, while the girthwise elastic tapes 40–42, 44, 45, 47, 48 and 50 which are aligned generally with the hole areas are locally offset-diverted so as to pass around the hole areas. They are thereupon realigned in parallel offset relation to provide the desired elastic continuity in the girthwise direction of the fabric. Because of the tape routing pattern as shown in the drawing herewith the angularly diverted portions of the tapes (for example, reference may be made to tapes 42–47) introduce lateral tension components in the fabric when stressed which would, if unopposed, tend to close the holes when the fabric is tensioned. However, note that the oppositely paired tapes, such as tapes 44-42 and 47-45 characteristically cooperate and balance out the tendencies thereof to transversely "squeeze" or close the holes. It should be noted that the elongated S pattern type distortion of each tape as it bypasses the hole area operates to apply substantially equal elongation stresses upon each elastic cord of the tape. Accordingly, undesirable stress anomalies are avoided in the tapes per se. In consequence the overlapped tape portions of successive layers of tapes are of substantially uniform material properties throughout the material thickness, whereby the desired ultimate strength is maintained.

FIG. 10 illustrates how the fabrication reacts to internal inflationary pressures when employed in the construction of an air cushion confining trunk as explained hereinabove. Note that the girthwise extending tape sections will relatively readily elastically extend while the lengthwise disposed tape sections resist or permit only limited extension as the case may be according to the stretch prescription for that portion of the fabrication. As a result thereof the relatively small elliptically shaped apertures through the fabrication are now extended so as to open up into substantially circular form as illustrated at 32 in FIG. 10.

It is to be particularly noted that in the case of the present invention the fabrication is such that when the fabric is elastically extended under normal operating conditions such as to a substantially 100 percent elongated condition (in the girthwise direction) the apertures 32 open up into substantially circular configurations. This provides for optimum air jet performance, and it will be appreciated that the fabrication may be readily engineered so that when it is inflated the circular ports provide for the desired rate of delivery of air against the reaction surface and into the air cushion cavity under the vehicle.

Furthermore, it will be noted that although the fabrication may be adapted when inflated to operate over a wide range of loadings as illustrated at FIG. 11, the areas of the ports 32 will remain substantially constant. This is due to the fact that the tape layup permits the holes 32 to elongate in the girthwise direction of the fabric (but only to a prescribed degree) while at the same time the transverse dimensions of the holes and of the intermediate portions of the fabric are substantially maintained. This is of course an important feature from the standpoint of performance of the air trunk system and control of the vehicle operation.

We claim:

1. In an air cushion vehicle having a body presenting a bottom surface, an inflatable trunk secured marginally thereof to said bottom surface normally to lie in contiguous relation thereto, and means associated with said vehicle for inflating said trunk causing it to bulge away from said bottom surface and circumscribe an air cushion space, the improvement wherein said trunk comprises a sheet of material which is relatively inelastic in one direction and is relatively elastic in a second direction essentially transverse to said one direction, said sheet comprising:

a first series of tapes associated with said sheet and disposed in side-by-side relation and running in said one direction, each tape of said first series including a matrix and a plurality of relatively inelastic tension cords embedded in and running lengthwise of such tapes, at least one pair of adjacent tapes of said first series having their adjacent side edges separated for a distance in said one direction by a first spacing in said second direction;

a second series of tapes associated with said sheet and running in said second direction, each tape of said second series including a matrix and a plurality of relatively elastic tension cords embedded in and running lengthwise of such tapes, there being a first separated pair of said tapes of the second series which are parallel and are separated by a second spacing which is greater than said first spacing whereby said first spacing defines the minor axis of an ellipse and said second spacing defines the major axis of such ellipse, said adjacent pair of tapes of the first series being separated in said one direction by at least said second spacing and said separated pair of said tapes of the second series crossing said adjacent pair such that said sheet has an elliptical opening therethrough delineated by said minor and major axes, there being a second pair of tapes of said second series disposed on opposite sides of one of said tapes of the first separated pair, said second pair of tapes criss-crossing each other and said one tape of the first separated pair at one end of said opening, there being a third pair of tapes of said second series disposed on opposite sides of the other of said tapes of the first separated pair, said third pair of tapes criss-crossing each other and said other tape of the first separated pair at the other end of said opening whereby when said trunk is uninflated said opening is elliptical whereas when said trunk is inflated said opening will assume a generally circular shape.

2. In an air cushion vehicle as defined in claim 1 wherein said second pair of tapes lie on opposite sides of and in side-by-side relation to said one tape of the first pair except at the crossing region with each other and said one tape, and wherein said third pair of tapes lie on opposite sides of and in side-by-side relation to said other tape of the first pair except at the crossing region with each other and said other tape.

3. In an air cushion vehicle a sheet material fabrication as set forth in claim 1, wherein said tension cords are crowded within portions of the fabrication peripherally of said opening means to reinforce the latter.

4. In an air cushion vehicle a sheet material fabrication as set forth in claim 1, wherein all of said tension cords bypass said fabrication opening means and extend thoughout the geometric extent of said fabric sheet without interruption.

5. In an air cushion vehicle a sheet material fabrication as set forth in claim 1, wherein said opening means comprise(s) a plurality of elliptically shaped openings arranged with their major axes aligned in row form extending transversely of the relatively elastic direction of said sheet.

6. In an air cushion vehicle having a body presenting a bottom surface, an inflatable trunk secured marginally thereof to said bottom surface normally to lie in contiguous relation thereto, and means associated with said vehicle for inflating said trunk causing it to bulge away from said bottom surface and circumscribe an air cushion space, the improvement wherein said trunk comprises a sheet of material which is relatively inelastic in one direction and is relatively elastic in a second direction essentially transverse to said one direction, said sheet comprising:

a sheet-like body of elastic material having at least one elliptical opening therethrough, the minor axis of such opening being aligned in said second direction and the major axis of such opening being aligned in said one direction;

a plurality of relatively inelastic tension cords embedded in said material and running in said one direction;

a plurality of relatively elastic tension cords embedded in said material and running in said second direction, there being a first separated pair of groups of relatively elastic tension cords which are parallel to each other and which are separated to delineate a space defining said major axis, there being a second separated pair of groups of relatively elastic tension cords on opposite sides of one group of said first pair, said second pair of groups criss-crossing each other and said one group at one end of said opening so that each group of said second pair is routed in a generally elongated S-shape, there being a third separated pair of groups of relatively elastic tension cords disposed on opposite sides of the other group of said first pair, said third pair of groups criss-crossing each other and said other group at the other end of said opening so that each group of said third pair is routed in a generally elongated S-shape, whereby when said trunk is uninflated said opening is elliptical whereas when the trunk is inflated said opening assumes a generally circular shape.

7. In an air cushion vehicle having a body presenting a bottom surface, an inflatable trunk secured marginally thereof to said bottom surface normally to lie in contiguous relation thereto, and means associated with said vehicle for inflating said trunk causing it to bulge away from said bottom surface and circumscribe an air cushion space, the improvement wherein said trunk comprises a sheet of material which is relatively inelastic in one direction and is relatively elastic in a second direction essentially transverse to said one direction, said sheet comprising:

a sheet-like body of elastic material having at least one elliptical opening therethrough, the minor axis of such opening being aligned in said second direction and the major axis of such opening being aligned in said one direction;

a plurality of relatively inelastic tension cords embedded in said material and running in said one direction;

a plurality of relatively elastic tension cords embedded in said material and running in said second direction, those elastic tension cords on one side of said opening and which otherwise would intersect therewith being divided into two first groups one of which is routed past one end of said opening is an elongated S pattern and the other of which is routed past the other end of said opening in an elongated S pattern, and those elastic tension cords on the other side of said opening and which otherwise would intersect therewith being divided into two further groups one of which further groups is routed past said one end of the opening in an elongated S pattern and the other of which further groups is routed past said other end of the opening in an elongated S pattern, whereby said one first group criss-crosses said one further group at said one end of the opening whereas said other first group criss-crosses said other further group at said other end of the opening so said opening is elliptical when said trunk is relaxed and is of generally circular shape when said trunk is inflated.

8. In an air cushion vehicle as defined in claim 7 wherein there are two additional groups of said relatively elastic tension cords which pass the opposite ends of said opening and are criss-crossed by the criss-crossed groups at such opposite ends of the opening.

* * * * *